United States Patent [19]

Hesse, Jr.

[11] Patent Number: 4,685,856
[45] Date of Patent: Aug. 11, 1987

[54] PIVOTING GATE UNLOADER

[76] Inventor: Ronald F. Hesse, Jr., 10670 Warren Rd., Plymouth, Mich. 48170

[21] Appl. No.: 730,816

[22] Filed: May 6, 1985

[51] Int. Cl.$^4$ ............................................. B60P 1/00
[52] U.S. Cl. .................................. 414/515; 198/746; 414/521
[58] Field of Search .............. 414/507, 512, 514, 515, 414/516, 521, 523, 525 R, 679; 198/746, 748

[56] References Cited

U.S. PATENT DOCUMENTS

| | | | |
|---|---|---|---|
| 766,866 | 8/1904 | Bendickson | 414/512 |
| 1,567,473 | 12/1925 | Starr | 198/746 |
| 1,868,973 | 7/1932 | Esseltine | 198/746 X |
| 2,552,743 | 5/1951 | Simpson | 198/748 X |
| 2,781,925 | 2/1957 | Baldridge et al. | 414/515 |
| 2,850,188 | 9/1958 | Eujen | 414/515 |
| 2,899,090 | 8/1959 | Holdren | 414/515 |
| 3,033,348 | 5/1962 | Andrew | 198/746 X |
| 3,211,308 | 10/1965 | Glass | 414/516 |
| 3,306,435 | 2/1967 | Wenger | 198/746 |
| 3,578,186 | 5/1971 | Thomas | 414/510 |
| 3,790,007 | 2/1974 | Sprague | 198/746 X |
| 3,990,359 | 11/1976 | Peis | 198/746 X |
| 4,078,677 | 3/1978 | Huggins et al. | 414/514 |
| 4,161,255 | 7/1979 | Ropart | 198/746 X |
| 4,320,008 | 3/1982 | Kokubo | 198/746 X |

FOREIGN PATENT DOCUMENTS 512139  6/1976  U.S.S.R. ................ 198/746

Primary Examiner—Leslie J. Paperner
Attorney, Agent, or Firm—Gifford, Groh, VanOphem, Sheridan, Sprinkle and Dolgorukov

[57] ABSTRACT

A portable unloader for a truck bed includes a gate entrained on a pair of cables so that it can be pivoted to and from a first raised position in which it is inclined with respect to the truck bed as it moves toward the rear of the truck bed, and a second position in which it lies substantially parallel to the truck bed as it moves through the load along the truck bed. In one form of the invention, the cables pass through slots near the lower edge of the plate, and the gate is secured near its opposite edge by restraining chains attached to the cable to limit the angle at which the gate is inclined with respect to the truck bed. Such a gate can also include a pair of wedge-shaped runners for initially orienting the gate at a slight angle to the truck bed so that a portion of the load of granular material is forced under the gate to lift it to its raised position as movement toward the rear of the truck is initiated. In another form of the invention, the gate is pivotally secured to a sled which slides along the truck bed. The sled includes upright supports pivotally securing the upper edge of the plate forming the gate above the truck bed. The sled can also include a supplemental pivoting gate secured to the forwardmost end of the sled to traverse the forwardmost portion of the truck bed.

6 Claims, 11 Drawing Figures

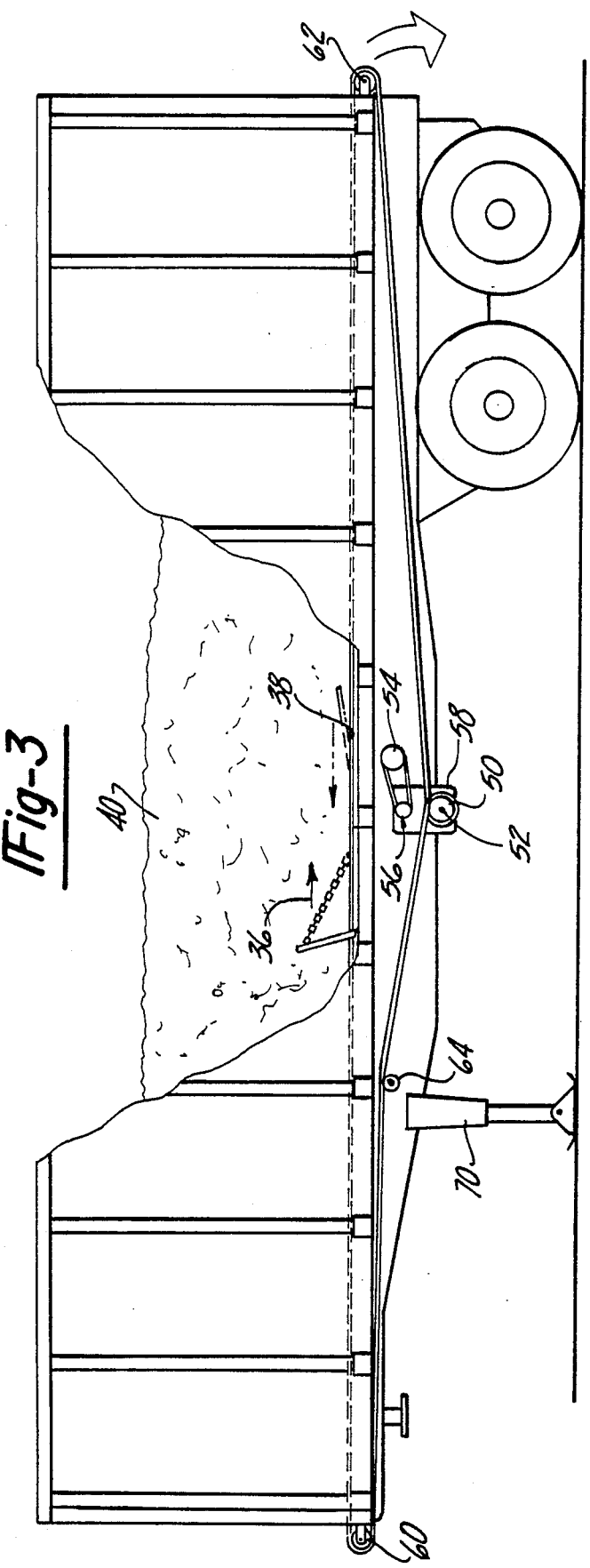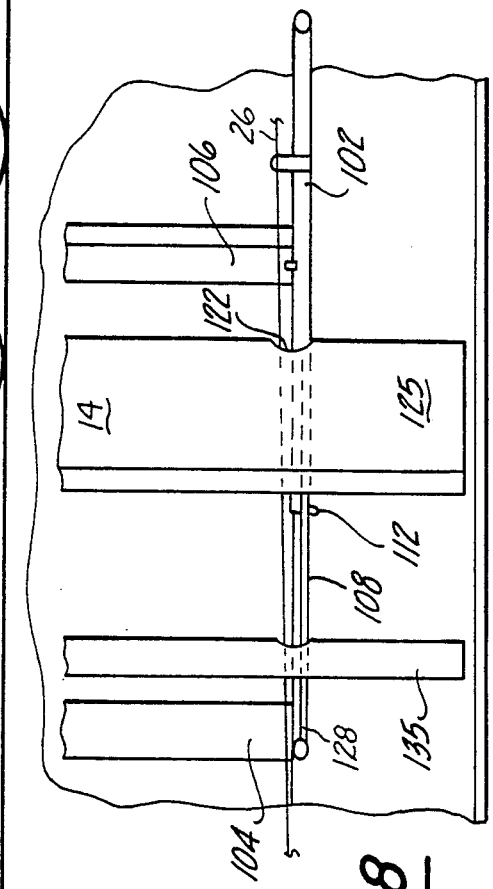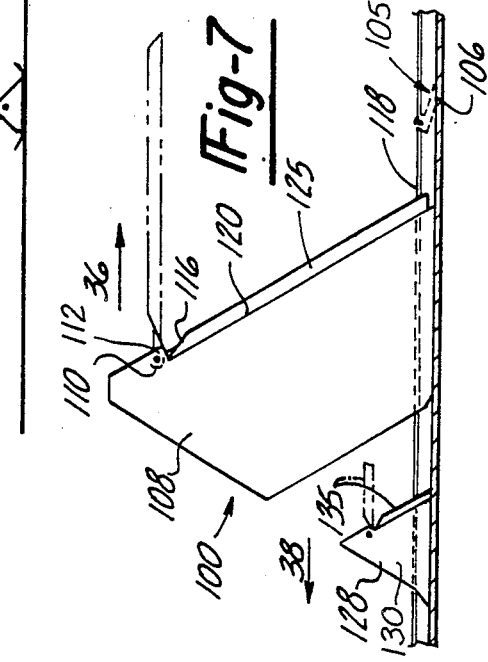

PIVOTING GATE UNLOADER

BACKGROUND OF THE INVENTION

I. Field of the Invention

The present invention relates generally to apparatus for article handling, and more particularly to a pivoting gate and means for conveying the pivoting gate along the length of the truck bed for moving particulate matter from the truck bed.

II. Description of the Prior Art

It is well known to transport loads of particulate matter, particularly, agricultural products such as beans, in a truck or tractor trailer combination. However, the unloading of such a truck can be extremely burdensome. Since loads of such products may only be carried during harvesting season, trucks purchased by farmers for transporting such granular material may not include automatic unloading means, such as a hydraulic dumping mechanism, because the high cost of such mechanisms cannot be justified for the limited use they receive. Moreover grain storage facilities to which a farmer's crop may be delivered are often well adapted to unload such truckloads. One known device for unloading the truck comprises a ramp adapted to receive the entire truck which can be inclined so that the entire truck is tilted to permit the load to discharge from the truck by the force of gravity. However, such a device is not practical for use by the farmer who occasionally needs to transport and unload granular products throughout the growing season or who desires to unload portions of the truck's contents at various locations throughout the farm. Rather, infrequent or partial unloading can require that the farmer resort to manual labor for unloading the truck. As a result, the unloading or partial unloading of the truck can be extremely time consuming and burdensome.

Moreover, previously known improvements for unloading trucks are often designed as a part of the truck or truck trailer and cannot be used for unloading other vehicles. For example, the U.S. Pat. No. 4,078,677 discloses a portable storage container in which a pusher plate is pivotally secured between carriage plates which slide along channels on the sides of the container. In such a device, the means for conveying the pusher plate is limited to the confines of the container, and thus cannot be used for removing the entire load from an elongated truck bed of greater width or length.

SUMMARY OF THE PRESENT INVENTION

The present invention overcomes the above-mentioned disadvantages by providing a portable, pivoting gate, truck unloader which is conveyed along the truck bed so as to displace a portion of the load contained on the truck bed. Moreover, the unloader is adapted to be used on truck beds of various lengths so that it is not limited to use with a limited truck bed area. Moreover, the unloader is compact and easily removed from the truck bed for storage or use on another vehicle as desired.

In one form of the invention, the unloader comprises a single plate pivotally secured to cables running along the length of the truck bed. The gate is pivoted to a raised position with respect to the truck bed when the gate is driven by the cable against the load and toward the rear of the truck. Conversely, during movement of the gate towards the front of the truck bed, the gate pivots downwardly substantially parallel to the truck bed. The gate preferably includes means for lowering the gate as it passes forwardly through the load and means for raising the gate as it moves rearwardly. Such means can be provided by the shape of the plate forming the gate or attachments applied to the plate. In this position, the leading forward edge of the gate is tapered so as to displace the granular load upwardly over the substantially horizontal gate and permits movement of the gate through the load toward the front of the truck bed with minimal driving force. The edge may also be provided with tines or other edge configuration which avoid packing of a load such as woodchips during displacement of the gate.

In another form, the pivoting gate is pivotally secured to upright supports of a sled adapted to slide along the truck bed. Sled can be secured to the cable conveying system which slides along the length of the truck bed. Preferably, the sled type unloader includes a first pivoting gate at a rearward end of the sled and the substantially smaller pivoting gate secured at the forward end of the sled. The sled includes cross braces having tapered or inclined forward edges which maintain the sled in position against the truck bed as the sled is moved through the load supported by the truck bed and minimize resistance to displacement through the load.

Preferably, the gate in the first form of the invention and the sled used in the second form of the invention are displaced by a cable mechanism comprising pair of cables displaceably supported on the truck bed by a plurality of pulleys and a pair of driving drums which coil the ends of the cables beneath the truck bed. The drums are driven by motor means for displacing the cables in both directions through the load such as a hydraulic motor. Preferably, the pulleys and the drive mechanism are bolted to accessible portions of the truck or trailer body so that they can be easily removed and remounted on another truck bed, even a truck bed having a different length.

Thus, the present invention provides a pivoting gate unloader which is portable and can be used on various truck beds without modification. Moreover, the gate pivots freely between raised and lowered position in response to the direction of movement of the conveying means and engagement with the load. Moreover, the pivoting gate provides substantially no resistance to movement of the load toward the rear of the truck in the event that the trailer is to be unloaded by other means such as inclination of the trailer. Thus the device need not be removed in the event that the truck is to be unloaded by alternative means as is previously known. In addition, the unloader of the present invention is substantially less complex and less expensive than previously known truck unloaders.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the views and in which:

FIG. 3 is a side elevational view of the unloader and trailer combination shown in FIGS. 1 and 2 with portions broken away for the sake of clarity;

FIG. 4 is enlarged top plan view of a portion of the device shown in FIG. 2;

FIG. 5a is an enlarged broken view of a portion of the device shown in FIG. 3;

FIG. 5b is a broken sectional view substantially the same as FIG. 5a but showing the gate in a different operating position;

FIG. 7 is a side elevational view of a modification of the unloader according to the present invention;

FIG. 8 is a broken top plan view of the modified unloader shown in FIG. 7;

DETAILED DESCRIPTION OF A PREFERRED EMBODIMENT OF THE PRESENT INVENTION

Figures 1, 2, 6:
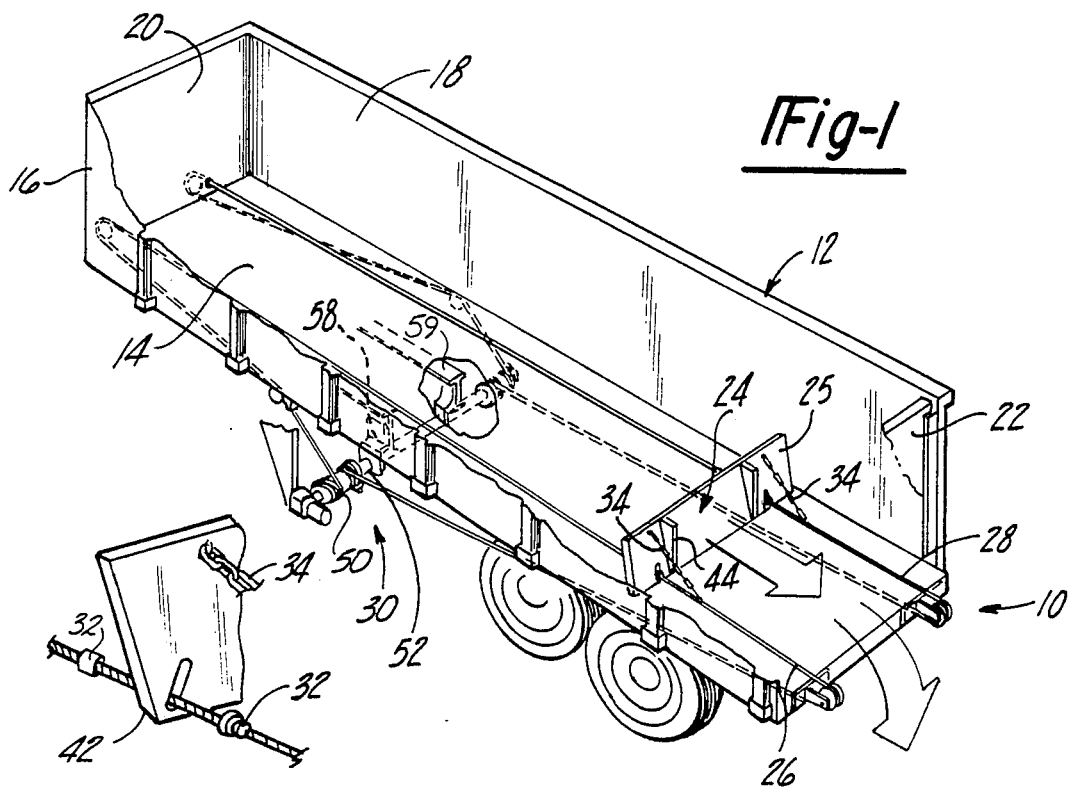
FIG. 1 is a perspective view of a truck unloader according to the present invention mounted on a truck trailer.
FIG. 2 is a top plan view of the unloader and trailer combination shown in FIG. 1.
FIG. 6 is an enlarged perspective view of a portion of the gate as shown in FIG. 1.

Referring first to FIG. 1, the truck unloader 10 according to the present invention is thereshown mounted to a truck trailer 12. The trailer 12 includes a flat bed 14 peripherally confined by side walls 16 and 18, front wall 20 and a closable gate 22. Of course, the walls 16, 18 and 20 need not be permanently secured to the flat bed 14 but can be sectional, stake-type walls commonly used in the transportation of agricultural, granular materials. Nevertheless, it will be understood that the unloader 10 of the present invention can be used regardless of the particular construction of the truck so long as it has a substantially flat bed 14.

The unloader 10 comprises a gate 24 pivotally mounted to a pair of cables 26 and 28 driven by a displacement assembly 30. The term cables as used herein is not to be understood as limiting, and refers to any flexible elongated member having a high tensile strength such as wire rope, chain, or the like. The gate 24 is in the form of a plate which extends across the flat bed 14 and having substantially the same width. Of course, the width of the gate 24 can be adjusted by adding additional side plates without departing from the scope of the present invention. As shown in FIG. 6, the gate 24 includes a pair of apertures in the form of slots that extend inwardly from a position near front edge 42 of the gate 24 and through which the cables 26 and 28 extend.

As best shown in FIG. 6, cable clamps 32 on the front edge of the gate 24 entrain the gate 24 in a substantially fixed position with respect to each cable 26 and 28 when the gate is moving rearwardly. Near the opposite edge of the gate 24, retaining loops secure the end of a flexible restraining member in the form of a chain 34 to the gate 24. The other end of chain 34 is secured by appropriate means such as a cable clamp 33 spaced rearwardly from the cable clamp 32 entraining the rearward side of the gate 34 as shown in FIG. 5a.

As best shown in FIG. 5a, displacement of the cables 26 and 28 moves the gate 24 rearwardly in the direction of the arrow 36. In this direction the gate 24 is urged against the load 40 as shown in FIG. 3. Thus, the gate 24 assumes a raised position at which it is inclined with respect to the truck bed 14. Thus, the gate 24 displaces a portion of the load 40 rearwardly of the gate 24 toward the rear of the bed 14. Conversely, when the cables 26 and 28 are moved in the direction of arrow 38 as shown in FIG. 5b, the gate 24 is moved in an opposite direction against the load 40 as shown in FIG. 3. Thus, the gate 24 assumes a position in which it is substantially parallel to the truck bed 14. Moreover, the front edge 42 of the gate 24 is tapered to reduce resistance to movement of the gate 24 in a forward direction 38.

Furthermore, the gate can be canted at a very slight angle to the bed 14 so that the load 40 is forced to move over the gate 24, whereby the gate 24 remains closely adjacent to the truck bed 14. As best shown in FIGS. 1, 5a and 5b, the gate 24 can include wedge-shaped runners 44 which maintain the small cant of the gate when it rests against the truck bed. The cant also insures that when the direction of the cable is reversed so that it moves rearwardly in the direction of arrow 36, an accumulation of the load 40 is pressed against the rear face 46 of the gate to raise it to the position shown in FIG. 5a.

The displacement assembly 30 comprises a pair of spaced apart drums 50 secured at the end of an axle 52 rotatably driven by a hydraulic motor 54 and gear mechanism 56 (FIG. 3). The ends of the axle 52 can be polygonally shaped so that the drums 50 are securely fixed for rotation therewith. As shown in FIG. 1, the axle 52 is rotatably supported by a pair of brackets 58 secured to the longitudinal beam 59 supporting the bed 14 of the trailer. Of course, hydraulic motors 54 and gear mechanism 56 in the form of previously known winch operation motors are well known and need not be discussed for the sake of brevity. Nevertheless, it is important to note that the path of the cables 26 and 28 and the manner in which the cables are coiled on the drums is controlled by the placement of a plurality of pulleys for guiding the cable about the truck bed.

Figure 9:
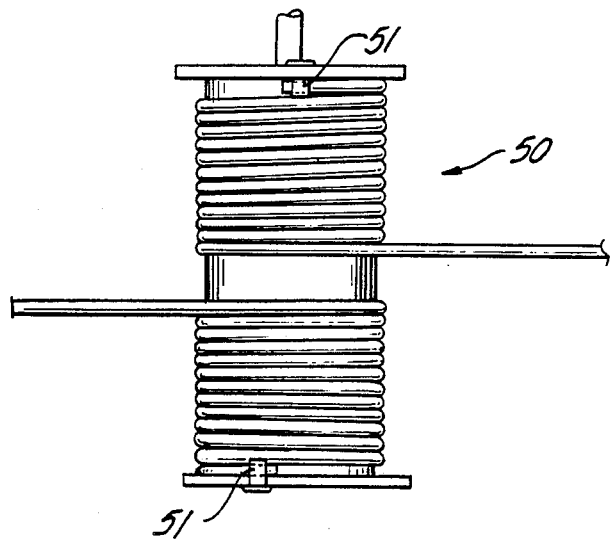
FIG. 9 is an enlarged perspective view of a drum of the unloader drive mechanism shown in FIGS. 2 and 3.

As best shown in FIGS. 2 and 3, a pair of pulleys 60 are secured at spaced apart positions on the front of the truck bed and a second pair of pulleys 62 aligned in registration with the first pair are secured to the rear of the truck bed 14. In addition, at least one pair of guide rollers 64, which can be in substantially the same form as the pulleys 60 and 62, are secured beneath the truck bed intermediate the front pulleys and the drive drums 50. The drive drums 50 are spaced laterally outwardly of the front and rear pulleys to aid in the winding of tight coils about the drums as shown in FIG. 2. The set of guide pulleys 64 are spaced apart substantially the same distance as the outer edges of the drums 50 so that as the cable is aligned toward the outer edge of the drum 50 as it returns from the front pulley 60. Thus, with one end of the cable secured to the drum 50 by a cable clamp or the like (see FIG. 9), the coils formed by the cable as the drum 50 turns are held tightly against each other to compactly coil the cable on the drum and thereby conserve the width of the drum needed to wrap the coil. Similarly, the opposite end of the cable 26 and 28 is secured at the laterally inner end of the drum 50 and coiled thereon so that coils of cable are unwound from the second coiled portion 68 in the same direction as the cable is accumulated on the first coiled portion 66 and vice versa.

Moreover, as best shown in FIG. 3, the pulleys 64 raise the cables above the landing gear assembly 70 so as to avoid any interference therewith. Moreover, it will be readily understood that additional guide pulleys can be employed rearwardly of the drums 50 if necessary to avoid interference with the wheels or other components of the trailer 12.

In addition, a typical pulley construction is shown in FIG. 4, wherein a pulley wheel 72 includes a peripheral groove 74 adapted to receive a cable 26 or 28. The pulley wheel is rotatably supported in journals 76 supported by side plates 78 secured to a base 80. The base 80 is adapted for mounting to the truck bed by appropriate means such as bolts 82. The base also includes a projection 84 extending into the groove 76 of the pulley wheel 72 which forms a scraper for removing accumulations of granular matter residue which may become engaged on the cables as they move through the load 40.

Figure 10:
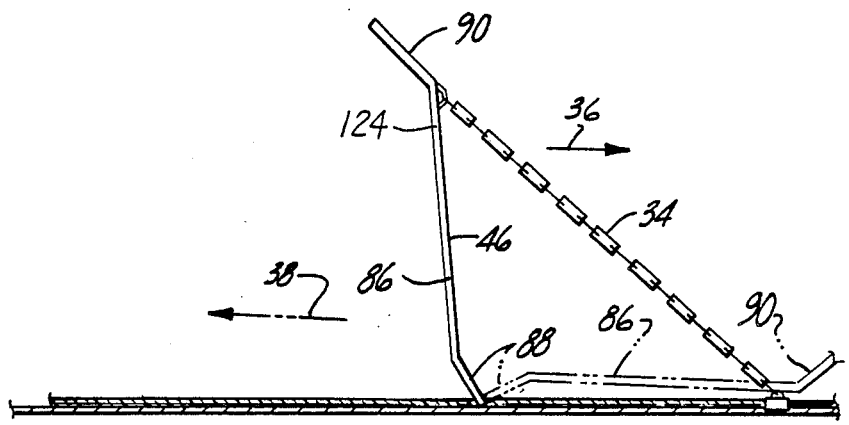
FIG. 10 is a side view of a modified gate of the unloader according to the present invention.

A modified form of gate 124 is shown in FIG. 10 comprising a plate 86 having an inclined end portion 88 extending downwardly from a rear face surface 46 and an end portion 90 opposite the end portion 88 inclined upwardly from the rear face surface 46. Such a plate 86 inherently provides means for lowering the gate when it is displaced forwardly through the load and raising the gate to its second position as it is displaced rearwardly through the load.

Referring now to FIG. 7, a modified form of the pivoting gate 24 comprises a plate 125 pivotally secured to a sled 100. The sled 100 is secured to the cables 26 and 28 by appropriate means such as cable clamps or the like mounted on the sled. In the preferred embodiment, the sled comprises a pair of elongated rods 102 which slidably support the sled 100 on the truck bed 14. Rods 102 are connected together by cross slats 104 and 106. As shown at 105, the slat 106 can be inclined slightly so that it maintains the sled against the truck bed 14 whereby the edge of the gate 24 is positioned close to the bed as the sled is moved rearwardly through the load.

The sled 100 also includes a pair of upright supports 108, preferably in the form of plates, which extend upwardly from the bars 102. The plate 125 is pivotally secured to the upper portion of the side plates 108. In the preferred embodiment, each upright plate 108 includes an aperture 110 adapted to receive a lateral projection 112 extending from a mounting tab secured at an edge 116 of the plate 125. The edge 116 of the plate 125 is tapered as shown in FIG. 7 so as to decrease the resistance of the plate as it passes through the load 40 in the direction of arrow 38 and in the position shown in phantom line in FIG. 7. The opposite edge 118 of the plate 125 is oppositely tapered so that leading edge of the plate is forced downwardly as it passes through the load 40 in the direction of arrow 36 as shown in FIG. 7. Preferably, the upright support plates 108 include an elongated recess along its rear edge 120 below the aperture 110 so that the plate 125 is firmly seated against the upright support plates 108 as the sled 100 is moved through the load 40 in the direction of arrow 36. In addition, the lower edge 118 of plate 125 can include recesses 122 adapted to receive a portion of a bar 102 and the cable secured thereto so that the edge 118 is closely adjacent the top surface of the truck bed 14.

It can be appreciated that the means for displacing the sled 100 in the form shown in FIGS. 7 and 8 cover substantially more longitudinal space than the form shown in FIGS. 1-6. As a result, there is a small area forwardly of the gate 125 which cannot be traversed by the gate 125. As a result, it has been found to be advantageous to provide a supplemental gate 130 in the form of a plate 135 which is substantially smaller than the plate 125. The plate 135 is pivotally supported by upright plates 128 substantially similar to the upright plates 108 but on a reduced scale. The means for pivotally securing the gate 135 to the upright plates 128 is substantially the same as shown for lateral projection 112 in FIG. 7. As a result, the supplemental gate 135 substantially reduces the forwardmost area which cannot be unloaded by the sled-type pivoting gate unloader.

As also shown in FIG. 8, the cable 26 can be directly secured to bars 102 which are spaced apart substantially the same distance as cables 26 and 28 so as to be aligned for secure engagement therewith along the entire length of, or at discrete points along the length of the sled 100.

In any event, the gate 24 or plate 125 in each form pivots between a first position in which the gate is raised to a position at which it is inclined with respect to the truck bed and the second position in which the gate is substantially parallel to the truck bed so that it can easily move through the load 40. Moreover, the angle of the gate with respect to the truck bed in its first position can be adjusted throughout a wide range without departing from the scope and spirit of the present invention. In fact, in the form shown in FIGS. 1-6, the angle is easily adjustable by adjusting the length of the flexible member 34 restraining the gate in its raised position as the gate is moved toward the rear of the truck in the direction of the arrow 36. Nevertheless, it is believed that the angles shown in FIGS. 5a and FIG. 7, wherein the gate is inclined at least slightly toward the front of the truck as it moves rearwardly, are preferred so that the gate is urged downwardly toward the top surface of the truck bed 14 as it is displaced along the bed.

Moreover, the unloader can be independently installed on truck beds of various lengths and is not limited for use with a single truck bed as with previously known truck unloaders. The operation of the unloader is not limited to a particular construction of the trailer side walls and can be used on trailers or trucks having permanent walls or removable wall sections. The drums 50 are wide enough to receive a substantial number of coil turns so that the installation of the unlader on a short truck or trailer bed enables additional coil turns to be formed in the coil portions 66 and 68. Moreover, by removing the cable clamp 51 (FIG. 9) which retains the end of the cable at the edge of a drum 50, the cable can be unwound from the drum 50 and removed from the truck. Likewise, the pulleys can also be easily removed so that the entire unloader can be removed and replaced on another vehicle.

As shown in FIG. 1, it is preferable to limit the height of the gate 24 so that the gate 24 is not engaged against a large amount of the contents of the truck and place excessive strain on the drive assembly 30. Moreover, as is shown in FIG. 1, the gate is preferably moved a slight distance from the rear of the truck before the truck is loaded so that only a small portion of the load need be moved to initiate the unloading of the truck. Preferably, after the rearmost portion of the load has been removed, the gate is retracted toward a forward position slightly ahead of its original position so that another partial section of the load is moved rearwardly on the truck. Such cycling movement of the gate will avoid the need for an extremely high powered motor and gear train for driving the gate along the truck bed. Moreover, such movement avoids the application of strong forces against the side walls of the vehicle, and permits the device to be used with trailers or trucks of various constructions.

In any event, it will be understood that the unloader is substantially less complex and substantially less expensive to make than previously known truck unloaders. In addition, it is well adapted for use on any truck bed regardless of the particular length or width of the bed to which the unloader is applied and regardless of the particular construction of the sidewalls which may enclose the bed.

Having thus described the present invention, many modifications thereto will become apparent to those skilled in the art to which it pertains without departing from the scope and spirit of the present invention as defined in the appended claims.

What is claimed is:

1. A device for unloading material from a truck bed, said truck bed having a top surface and a bottom portion extending between an open end and an opposite closed end, said device comprising:
    a pair of cables, each of said pair of cables extending along said top surface of said truck bed, around said open end and said closed end and underneath said bottom portion;
    means for supporting said cables about said open end and said closed end;
    means for reciprocally displacing said cables mounted to said truck bed;
    a gate having a top portion, a center portion and a bottom portion, said bottom portion pivotally mounted to said pair of cables, said gate pivotable between a first upright position for moving material towards said open end when said cables are displaced in an unloading direction and a feathered positioned for movement of said gate toward said closed end of said truck bed when said pair of cables are displaced in an opposite direction, said pair of cables pulling said gate along said top surface of said truck bed, said bottom portion of said gate extending diagonally downwardly from said center portion in a direction towards said open end of said truck bed when said gate is in said upright position, such that the weight of said material acts to direct said gate downwardly against said top surface of said truck bed when said gate is drawn through said material in said first upright and feathered positions,
    a pair of flexible elongated members, each of said pair of elongated members having one end affixed to said top portion of said gate and an opposite end mounted to a respective one of said pair of cables, said pair of elongated flexible members retaining said gate in said upright position when said gate is displaced in said unloading direction.

2. The invention as defined in claim 1 wherein said bottom portion of said gate is tapered.

3. The invention as defined in claim further comprising means for pivotally securing said gate to said cables.

4. The invention as defined in claim 3 wherein said means for pivotally securing said gate to said cables comprises a pair of spaced apart apertures positioned in said bottom portion of said gate, said pair of apertures adapted to receive said cables therethrough, and means for entraining said gate mounted to said cable.

5. The invention as defined in claim 1 further comprising means for raising said gate from said feathered position to said upright position when the direction of said pair of cables is reversed.

6. The invention as defined in claim 5 wherein said means for raising comprises said top portion of said gate being inclined in a direction towards said closed end of said truck bed when said gate is in said upright position, said top portion pushing against the material to raise said gate when said gate is pivoted from said feathered position to said upright position.

* * * * *

UNITED STATES PATENT AND TRADEMARK OFFICE
CERTIFICATE OF CORRECTION

PATENT NO. : 4,685,856

DATED : August 11, 1987

INVENTOR(S) : Ronald F. Hesse, Jr.

It is certified that error appears in the above-identified patent and that said Letters Patent is hereby corrected as shown below:

Col. 8, line 18 after "claim", insert --1--.

Col. 5, line 8, delete "76" and insert --74--.

Signed and Sealed this

First Day of December, 1987

Attest:

DONALD J. QUIGG

Attesting Officer

Commissioner of Patents and Trademarks